(12) United States Patent
Ishikawa et al.

(10) Patent No.: US 7,211,316 B2
(45) Date of Patent: May 1, 2007

(54) OPTICAL MULTILAYER

(75) Inventors: Tomohiro Ishikawa, Rochester, NY (US); James F. Elman, Fairport, NY (US); Dennis J. Massa, Pittsford, NY (US); Erica N. Montbach, Pittsford, NY (US); David M. Teegarden, Pittsford, NY (US)

(73) Assignee: Nitto Denko Corporation, Ibaraki-shi (JP)

( * ) Notice: Subject to any disclaimer, the term of this patent is extended or adjusted under 35 U.S.C. 154(b) by 410 days.

(21) Appl. No.: 10/694,547

(22) Filed: Oct. 27, 2003

(65) Prior Publication Data

US 2005/0089676 A1 Apr. 28, 2005

(51) Int. Cl.
*B32B 7/02* (2006.01)
*G02F 1/13* (2006.01)
*G02F 1/1335* (2006.01)

(52) U.S. Cl. ............... 428/212; 428/1.1; 428/1.31; 428/1.33; 428/1.55; 428/220; 349/2; 349/96; 349/127

(58) Field of Classification Search ............ 428/212, 428/1.1, 1.3, 1.31, 1.33, 1.55, 1.6, 220; 349/2, 349/96, 127
See application file for complete search history.

(56) References Cited

U.S. PATENT DOCUMENTS 6,261,649 B1 7/2001 Takagi et al.
6,937,310 B2 * 8/2005 Elman et al. ............... 349/118
2003/0174399 A1 9/2003 Kusumoto et al.

FOREIGN PATENT DOCUMENTS

EP 1 118 885 7/2001

OTHER PUBLICATIONS

Fuming Li, et al, "Polyimide Films as Negative Birefringent Compensators for Normally White Twisted Nematic Liquid Crystal Displays", POLYMER, vol. 37, No. 23, 1996, pp. 5321-5325.

* cited by examiner

*Primary Examiner*—Rena Dye
*Assistant Examiner*—Lawrence Ferguson
(74) *Attorney, Agent, or Firm*—Westerman, Hattori, Daniels & Adrian, LLP.

(57) ABSTRACT

Disclosed is an optical multilayer comprising a polymeric substrate having a non-zero out-of plane birefringence and an amorphous polymeric overlayer that comprises an amorphous polymer having a Tg value above 160° C. and having the sign of its out-of-plane birefringence opposite to that of the polymeric substrate so as to provide a total out-of-plane phase retardation of said optical multilayer of between −30 nm and 30 nm for wavelengths of light between 400 and 700 nm.

19 Claims, 7 Drawing Sheets

OPTICAL MULTILAYER

FIELD OF THE INVENTION

The present invention relates to an optical multilayer comprising a polymeric substrate having a non-zero out-of-plane birefringence and an amorphous polymeric overlayer having an out-of-plane birefringence of opposite sign to the substrate. The multilayer has an overall low out-of-plane phase retardation.

BACKGROUND OF THE INVENTION

Due to the low material cost and ease of processing, polymeric materials are widely used in opto-electronic components. An ongoing objective is to replace inorganic glasses that are known to be "fragile", "heavy" and "hard for machining". Polymeric materials, however, have optical characteristics that are process dependent, especially birefringence. All optical grade polymers are transparent and amorphous. When amorphous polymers are processed into a desirable shape, they are not optically isotropic, unlike the inorganic glasses. That is, the three indices of refraction, nx, ny and nz, are not equal. This is due to polymer-chain orientation that is unique to polymers. Thus, given a process condition, the observed optical anisotropy depends on the degree of polymer chain alignment. Polymer molecules have intrinsic birefringence $\Delta n_{int}$ that is determined by factors, such as the polarizabilities of functional groups and their bond angles with respect to the polymer chain. The polymer products have extrinsic birefringence (in-plane or out-of-plane) that is different from the intrinsic birefringence and that is strongly process dependent. Depending on the application, the birefringence has to be controlled to meet the application requirement. In many cases, it is desirable to have substantially low birefringence or phase retardation in both the in-plane and out-of-plane directions.

In the optical disk application such as Compact Disk (CD) and Digital Video Disk (DVD), the substrate materials must satisfy conditions such as, 1) high transmission, 2) low humidity permeation, 3) dimensional stability and 4) low birefringence. Typically, the reading of optical disks involves the detection of slight changes n the polarization state or a change in the intensity of the reflected light from a disk surface. Thus, the birefringence in the disk substrate will have detrimental effects on the readout, such as read-error or noise. Optical disk substrates are manufactured by injection molding of polymers. Polycarbonate (PC) has been widely used for substrates for CD and DVD. It has high transmission, high dimensional stability against heat and humidity, and high mechanical strength. PC, however, has relatively high intrinsic birefringence $\Delta n_{int}$. The process of injection molding generates alignment of polymer chains. Thus, a polymer with high intrinsic birefringence, such as PC, is prone to generate unacceptable levels of in-plane retardation $R_{in}$ and out-of-plane retardation $R_{th}$. In order to prevent this problem, one typically adjusts the molding conditions, such as temperature and flow-rate. This optimization of process conditions has been successfully applied to significantly reduce the $R_{in}$ through the reduction of $\Delta n_{in}$. In some cases, the in-plane birefringence $\Delta n_{in}$ for normally incident light can be made as low as $1\sim3\times10^{-5}$. On the other hand, the out-of-plane birefringence $\Delta n_{th}$ is typically negative and with the optimized molding process the value is $-6\sim-5\times10^{-4}$. Even though the value of $\Delta n_{th}$ is small, the corresponding phase retardation for obliquely incident light is not negligible due to the substantial thickness of substrate, $\sim1$ mm. Thus, the light incident on the substrate at an oblique angle $\phi$ (measured from the substrate normal direction) will suffer a phase retardation that scales as $\phi^2$ for small $\phi$. In some cases, the total phase retardation, taking into account reflection, at $\phi=30°$ can reach as much as $-150$ nm.

In typical Liquid Crystal Displays (LCDs), a liquid crystal cell is situated between a pair of polarizers. Incident light polarized by the polarizer passes through a liquid crystal cell and is affected by the molecular orientation of the liquid crystal, which can be altered by the application of a voltage across the cell. The altered light goes into the second polarizer. Typical polarizers used widely for liquid crystal displays (LCDs) have a structure such that absorptive polarizing layer (e.g., iodine dye absorbed Polyvinyl Alcohol (PVA) layer) is sandwiched between the triacetylcellulose (TAC) substrate. TAC is widely used for polarizer manufacturing partly because of its low $\Delta n_{int}$. For a typical un-stretched TAC, the $\Delta n_{in}$ is in the order of $5\times10^{-5}$. Thus TAC with 100 µm thickness has $R_{in}\sim 5$ nm. This amount of phase retardation is not significant and light linearly polarized by the PVA layer essentially remains linearly polarized going through the TAC layer., However, this is true only when light is normally incident to the plane of the polarizer. Most of the TAC substrates are known to have negative $\Delta n_{th}$ of the order $\sim-5\times10^{-4}$. That would give $R_{th}\sim-50$ nm. This out-of-plane phase retardation $R_{th}$ is responsible for the change in the state of polarization for obliquely incident light. It is favorable to have finite negative $\Delta n_{th}$ in TAC substrates for some modes of LCDs. This is because of the fact that the negative $R_{th}$ can compensate positive $R_{th}$ of the liquid crystal molecules that are aligned perpendicular to the liquid crystal cell plane. However, negative $\Delta n_{th}$ of TAC has a detrimental effect in the LCD mode where the liquid crystal remains essentially parallel to the plane of the cell. This is the case for In-Plane-Switching LCDs, in which liquid crystal molecules rotate while remaining substantially parallel to the plane of the cell.

In a typical backlight LCD, the backlighting assembly contains several optical films that improve the light distribution and polarization before reaching the liquid crystal cell. This backlighting assembly 201 is illustrated in FIG. 2. Light exiting the backlight, 203, first encounters optical films that improve light distribution in the display, such as, diffusing films, 205 and brightness enhancement films, 207. Light is then incident on a reflective polarizer 209 that contains a substrate, 211, and a polarizing layer, 213, which transmits one polarization state and reflects the other polarization state. The next component in the optical path is the absorptive polarizer 215, which contains a bottom substrate, 217, an absorbing polarizing layer, 219, and a top substrate, 221. The transmission axis of the absorptive polarizer and that of the reflective polarizer are parallel. Ideally, the polarization state that is transmitted by the reflective polarizer 209 is the same polarization state transmitted by the absorbing polarizer 215. The optical stack between the backlight 203 and the reflective polarizer 209 recycles the polarization state that is reflected. The polarized light incident on the absorption polarizer 215 must be substantially linearly polarized so that light is effectively transmitted and not absorbed. As stated earlier, typical absorption polarizers contain TAC as a substrate 217, 221 on either side of the absorbing polarizing layer 219. Negative out-of-plane birefringence of TAC used as the bottom substrate 217 converts the linearly polarized light, incident on the absorption polarizer 215, to elliptically polarized light. The polarizing layer 219 will then absorb a portion of the elliptically polarized light. Thus, decreasing the light through put of the display.

To have the most light through put, the bottom substrate 217 between the reflective polarizer 209 and the absorptive polarizing layer 219 must have small $\Delta n_{th}$ and $R_{th}$.

As mentioned before, careful adjustment of the process can significantly reduce the $\Delta n_{in}$, thus the $R_{in}$ of the polymeric substrate. It is conceivable that additional optimization of the processing condition would further decrease the residual negative $\Delta n_{th}$. However, it increases the manufacturing cost. Alternative method is to form a multilayer. That is to dispose an overlayer with positive $R_{th}$ on the polymeric substrate having negative $R_{th}$. This process provides an optical multilayer that has low $R_{th}$ ($-30$ nm$<R_{th}<30$ nm) for wavelength $\lambda$ in the range 400 nm$<\lambda<700$ nm.

Several methods of generating a layer with non-zero $\Delta n_{th}$ thus $R_{th}$ have been known.

As is well known to those who are skilled in the art, liquid crystals that is uniformly aligned perpendicular to the substrate generate positive $\Delta n_{th}$ if $\Delta n_{int}$ of liquid crystal is positive. Polymerizable liquid crystal, such as the one disclosed in U.S. Pat. No. 6,261,649 gives perpendicular alignment. However, liquid crystal compounds generally have a high cost and creating a uniform alignment of liquid crystals in large manufacturing scale is complicated and not trivial. In some cases, it requires photo-polymerization process in order to freeze the perpendicular alignment, adding extra process and cost.

Li et al. (Polymer, Vol. 37, Page 5321–5325, 1996) describe the process of generating the non-zero $R_{th}$ by spin-coating polyamides on a transparent substrate. The random orientation of polyimide polymer chain is generated. The disclosed process is simple coating of polymers. However, the resulting $\Delta n_{th}$ and $R_{th}$ are negative. Therefore, the method only enhances the negativity of the $\Delta n_{th}$ of the polymer substrates described above.

With process optimizations, it is difficult to obtain a polymer substrate with sufficiently small $R_{th}$. Also, the prior art fails to provide a simple method to generate a polymer layer with positive $\Delta n_{th}$, thus making the manufacturing process for the polymeric multilayer with low $R_{th}$ difficult. Therefore, it is a problem to be solved to provide a polymeric multilayer and a simple method of making it where the multilayer includes a polymer layer with positive $\Delta n_{th}$ that can be disposed on polymeric substrate with negative $R_{th}$ to form a multilayer having low $R_{th}$.

SUMMARY OF THE INVENTION

The invention provides an optical multilayer comprising a polymeric substrate having a non-zero out-of plane birefringence and an amorphous polymeric overlayer that comprises an amorphous polymer having a Tg value above 160° C. and having the sign of its out-of-plane birefringence opposite to that of said polymeric substrate so as to provide a total out-of-plane phase retardation of said optical multilayer of between $-30$ nm and 30 nm for wavelengths of light between 400 and 700 nm.

The invention thus provides a polymeric multilayer and a simple method of making it where the multilayer includes a polymer layer with positive $\Delta n_{th}$ that can be disposed on polymeric substrate with negative $R_{th}$ to form a multilayer having low $R_{th}$.

DETAILED DESCRIPTION OF THE INVENTION

The following definitions apply to the description herein:

Order parameter, S refers to the degree of alignment of the polymer with respect to the reference direction. It is given by $$S = \frac{3\langle\cos\theta^2 - 1\rangle}{2},$$

where $\theta$ is an angle between the reference direction and the individual segment in the polymer chain. Brackets $\langle\rangle$ indicate the statistical average. S can take value from $-0.5$ to 1.0.

Figure 1:
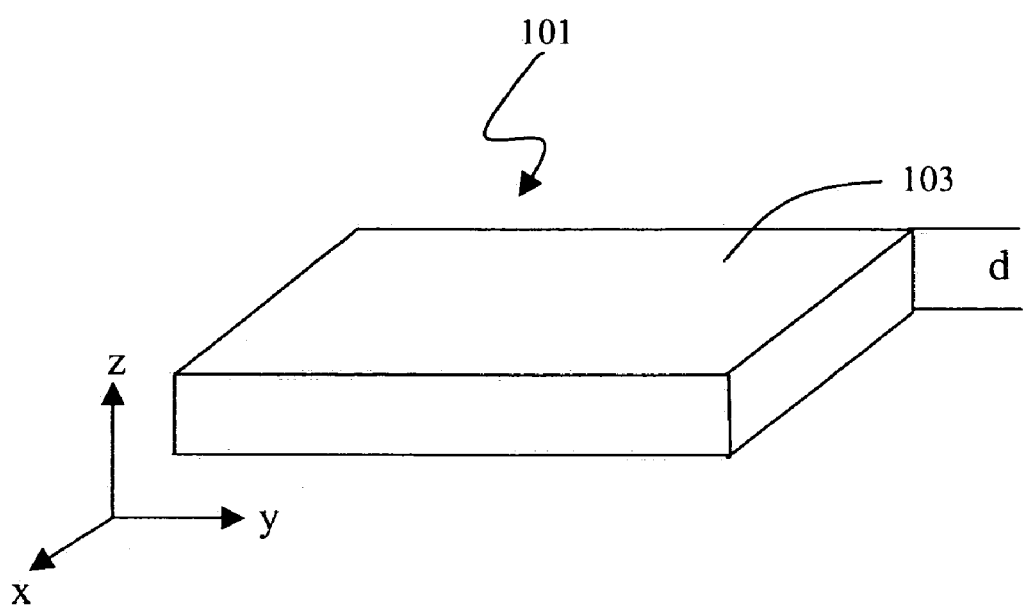
FIG. 1 is a view of a layer with thickness d and x-y-z coordinate system attached to the layer.
Figure 2:
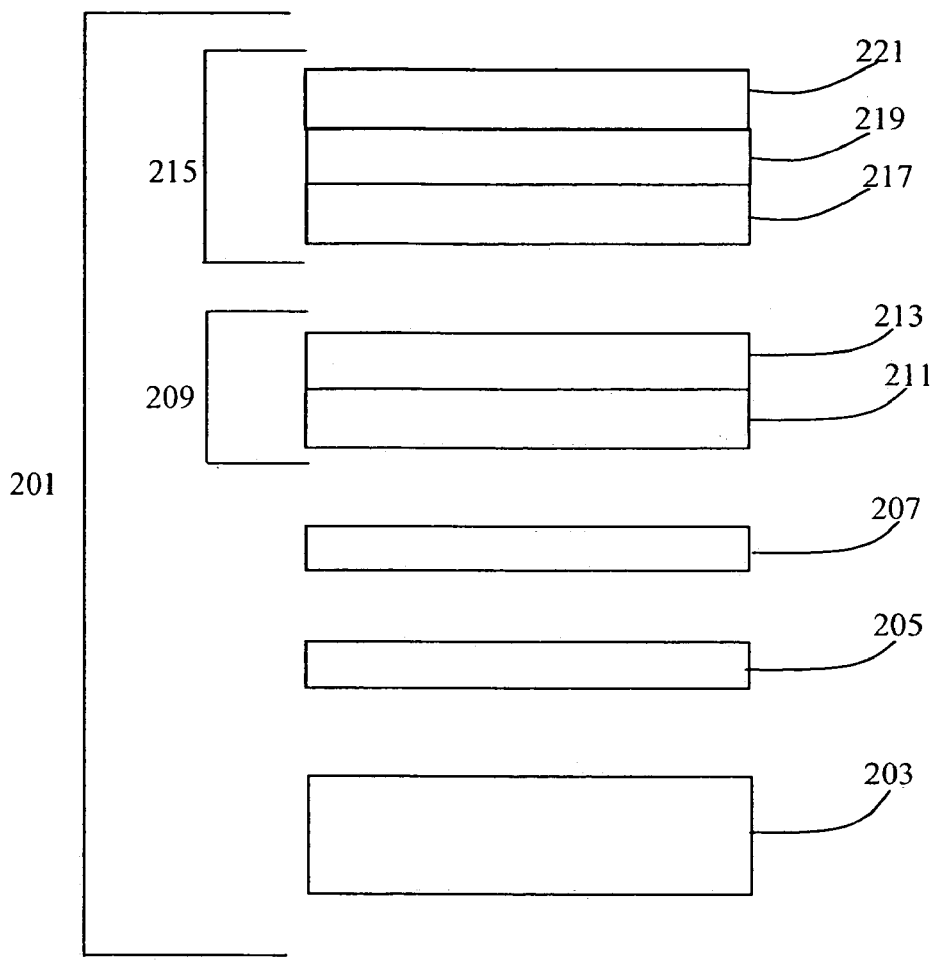
FIG. 2 is an elevation schematic of the typical LCD backlighting unit.

In-plane phase retardation, $R_{in}$, of a layer 101 shown in FIG. 1 is a quantity defined by (nx−ny)d, where nx and ny are indices of refraction in the direction of x and y. x is taken as a direction of maximum index of refraction in the x-y plane and y direction is perpendicular to it. x-y plane is parallel to the plane 103 of the layer. d is a thickness of the layer in z-direction. The quantity (nx−ny) is referred as in-plane birefringence, $\Delta n_{in}$. The value of $\Delta n_{in}$ is given at wavelength $\lambda$=550 nm.

Out of-plane phase retardation, $R_{th}$, of a layer 101 shown in FIG. 1 is a quantity defined by [nz−(nx+ny)/2]d. nz is the index of refraction in z-direction. The quantity [nz−(nx+ny)/2] is referred as out-of-plane birefringence, $\Delta n_{th}$. If nz>(nx+ny)/2, $\Delta n_{th}$ is positive, thus the corresponding $R_{th}$ is also positive. If nz<(nx+ny)/2, $\Delta n_{th}$ is negative and $R_{th}$ is also negative. The value of $\Delta n_{th}$ is given at $\lambda$=550 nm.

Intrinsic Birefringence $\Delta n_{int}$ of polymer refers to the quantity defined by (ne−no), where ne, and no are extraordinary and ordinary index of the polymer, respectively. The actual birefringence (in-plane $\Delta n_{in}$ or out-of-plane $\Delta n_{th}$) of polymer layer depends on the process of forming it, thus the order parameter, and the $\Delta n_{int}$.

Amorphous means a lack of long-range order. Thus an amorphous polymer does not show long-range order as measured by techniques such as X-ray diffraction.

Transmission is a quantity to measure the optical transmissivity. It is given by the percentile ratio of out coming light intensity $I_{out}$ to input light intensity $I_{in}$ as $I_{out}/I_{in} \times 100$.

Chromophore herein is defined as an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). A non-visible chromophore is one that has an absorption maximum outside the range of 400–700 nm.

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

Figure 3A:
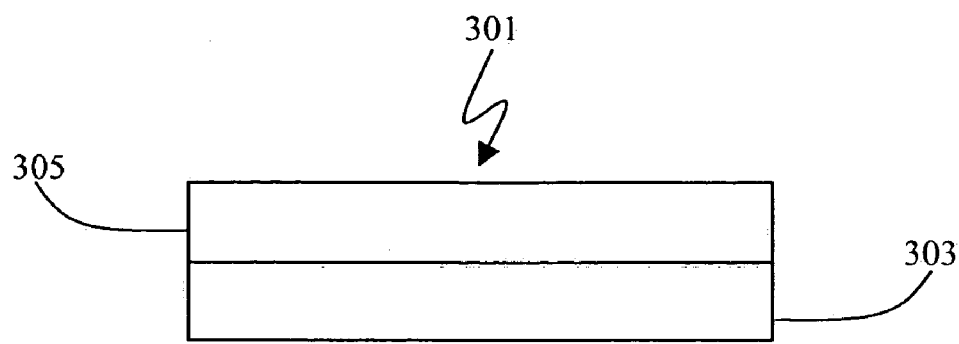
FIG. 3A, FIG. 3B and FIG. 3C are elevation schematics of the optical multilayer.
Figure 3B:
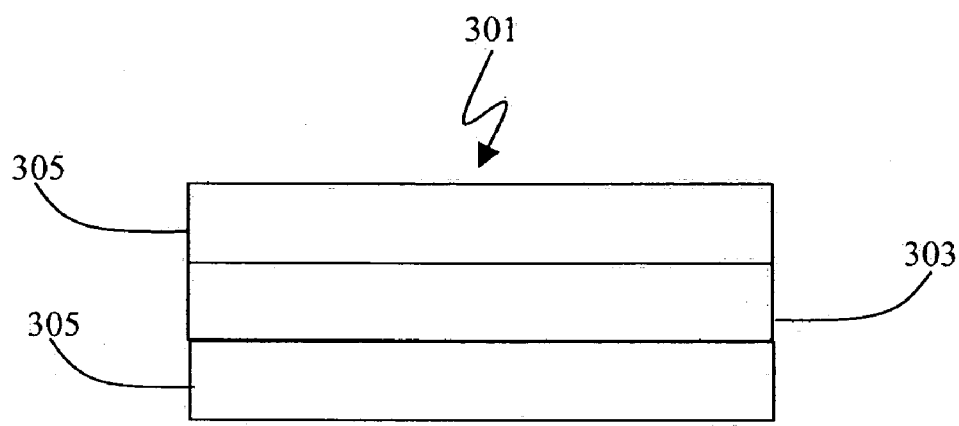
Figure 3C:
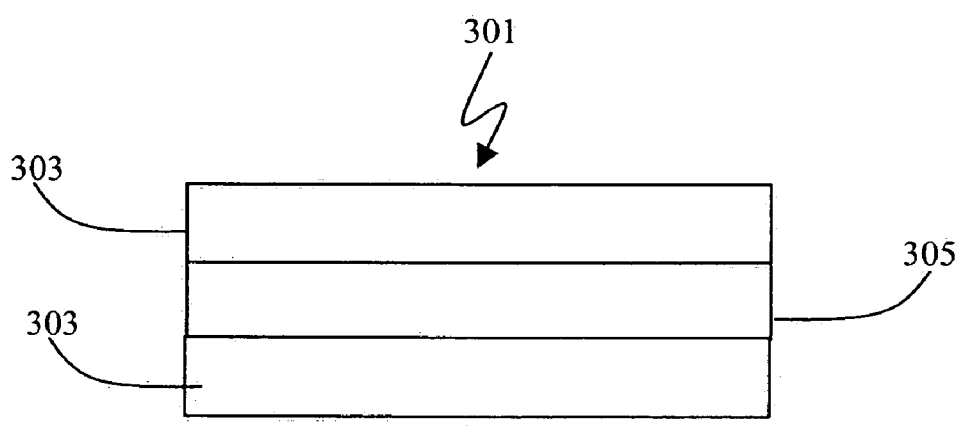

FIG. 3A shows the structure of an optical multilayer 301 according to the invention. 303 is a polymeric substrate and 305 is an amorphous polymeric overlayer. The amorphous polymeric overlayer 305 can be disposed on both sides of the polymeric substrate 303 as shown in FIG. 3B. Two polymeric substrates 303 can be disposed on both side of the amorphous polymeric overlayer, FIG. 3C. The $\Delta n_{th}$ of the polymeric substrate 303 is negative and that of amorphous polymeric overlayer 305 is positive. Generally, the value of $\Delta n_{th}$ of the substrate 303 is extremely small ($-1\times10^{-4}$~$-3\times10^{-5}$). However, if the thickness of the substrate 303 is significant (e.g. ~1 mm), the $R_{th}$ is not negligible and would be in the range of $-100$ nm~$-30$ nm. On the other hand, the $\Delta n_{th}$ of the overlayer 305 is more positive than $5\times10^{-3}$ (0.005). Thus, thickness of the overlayer 305 is much smaller than that of the substrate for an optical multilayer 301 with $-30$ nm$<R_{th}<30$ nm for 400 nm$<\lambda<700$ nm. For example, in order to balance the $R_{th}=-50$ nm from the substrate 303 (e.g., thickness 1 mm and $\Delta n_{th}=-5\times10^{-5}$), the amorphous polymer overlayer 305 would only be 5 μm, if $\Delta n_{th}$ of the overlayer 305 is 0.01. To keep overall thickness of multilayer 301 within the reasonable range, the thickness of polymer overlayer 305 is preferably between 1 to 50 μm or more preferably 5 to 20 μm. Transmission of the overlayer 305 should be high enough so that the overall transmission of the optical multilayer 301 remains high. The transmission of amorphous polymer overlayer 305 is preferably higher than 80% or more preferably higher than 90% for 400 nm$\leq\lambda\leq700$ nm.

Figure 4A:
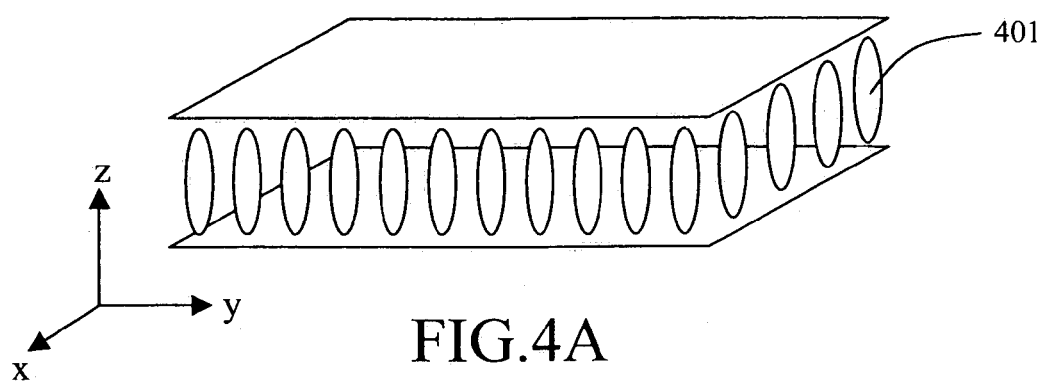
FIG. 4A and FIG. 4B are schematic views of perpendicular alignment of liquid crystals, and random in-plane orientation of amorphous polymer chain, respectively.
Figure 4B:
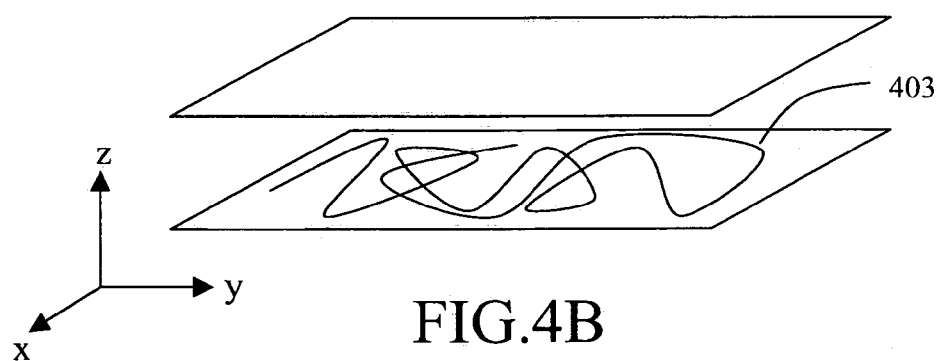

As is well known to those who are skilled in the art, the birefringence of amorphous polymer $\Delta n_p$ is given by $\Delta n_p = S\Delta n_{int}$. In the prior art, a perpendicular alignment (in z direction in FIG. 4A) of liquid crystals 401 is used to generate positive $\Delta n_{th}$. In this case, S is in the range $0\leq S\leq 1$ and $\Delta n_{int}$ is positive. If the polymer chain 403 is randomly oriented in the plane of the polymer layer as shown in FIG. 4B, the $\Delta n_{th}$ is generated while $\Delta n_{in}$ is zero. For such an orientation, the order parameter S of the polymer chain is in the range $-0.5<S<0$. Thus, in order to obtain positive $\Delta n_{th}$ for amorphous polymeric overlayer on the polymeric substrate, polymers with negative $\Delta n_{int}$ can be used. Examples of such a polymers would include materials that have non-visible chromophores off of the polymer backbone. Such non-visible chromophores would include: vinyl, carbonyl, amide, imide, ester, carbonate, sulfone, azo, and aromatic heterocyclic and carbocyclic groups (e.g. phenyl, naphthyl, biphenyl, terphenyl, phenol, bisphenol A, and thiophene). In addition, combinations of these non-visible chromophores could be desirable (i.e. copolymers). Examples of such polymers and their structures are shown below.

EXAMPLE I poly(4 vinylbiphenyl)

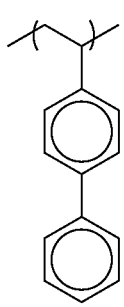

EXAMPLE II poly(4 vinylphenol)

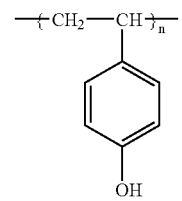

EXAMPLE III poly(N-vinylcarbazole)

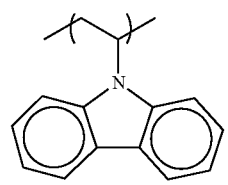

EXAMPLE IV poly(methylcarboxyphenylmethacrylamide)

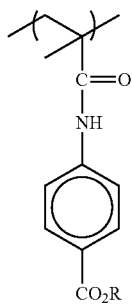

EXAMPLE V poly[(1-acetylindazol-3-ylcarbonyloxy)ethylene]

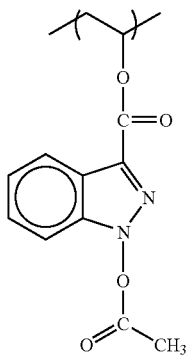

EXAMPLE VI poly(phthalimidoethylene)

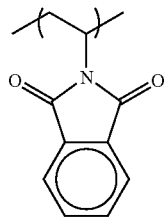

EXAMPLE VII poly(4-(1-hydroxy-1-methylpropyl)styrene)

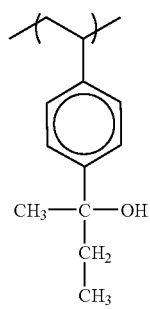

EXAMPLE VIII poly(2-hydroxymethylstyrene)

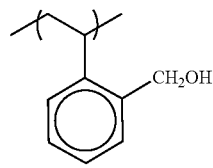

EXAMPLE IX poly(2-dimethylaminocarbonylstyrene)

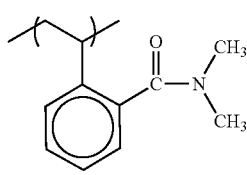

EXAMPLE X poly(2-phenylaminocarbonylstyrene)

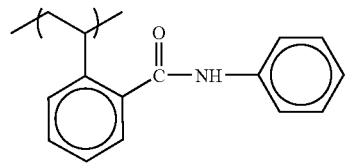

EXAMPLE XI poly(3-(4-biphenylyl)styrene)

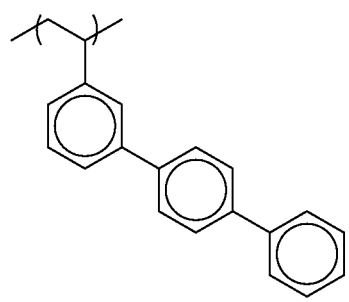

EXAMPLE XII poly(4-(4-biphenylyl)styrene)

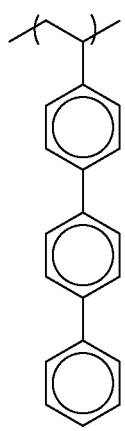

Another important factor is to obtain finite negative value of S. One way to achieve such negative S values is to solvent coat polymers whose glass transition temperature Tg is greater than 160° C. Such polymers will not have sufficient time to relax upon solvent evaporation and will retain a negative S value.

Examples of polymeric substrate can be made of polycarbonate, TAC, cyclic polyolephin, and other commonly used polymers in opto-electronic device applications. The thickness of polymer substrate should be sufficient to maintain mechanical integrity and handling ease. It is preferably between 10 μm to 5 mm or more preferably between 30 μm to 2 mm.

Figure 5A:
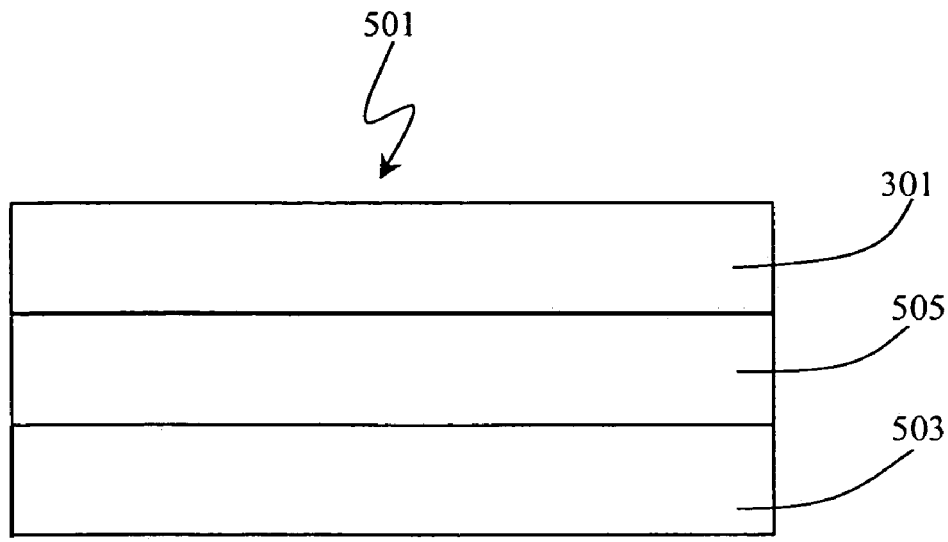
FIG. 5A and FIG. 5B are elevation schematics of polarizer with optical multilayer.
Figure 5B:
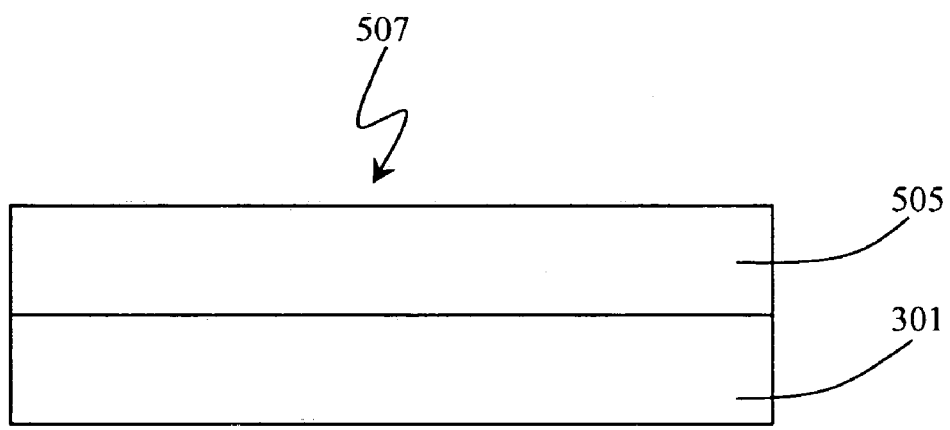

FIG. 5A is the elevation schematic for an absorptive polarizer 501 with an optical multilayer 301. The multilayer 301 has a structure such as the one shown in FIGS. 3A, 3B and 3C. Polarizing layer 505 is made of, for example, dye absorbed PVA film. The substrate 503 can be the optical multilayer, such as 301 or other single layer polymeric material. FIG. 5B is yet another example of polarizer 507. In this case, polarizing layer 505 is contiguously disposed on the multilayer 301. This is a typical structure of the reflective polarizer. As is well known to those who are skilled in the art, layer of cholesteric liquid crystal functions as reflective polarizing layer. Also, reflective polarizer based on periodically placed metal thin wire such as the one disclosed in U.S. Pat. No. 6,081,376 can be the polarizing layer 505.

Figure 6:
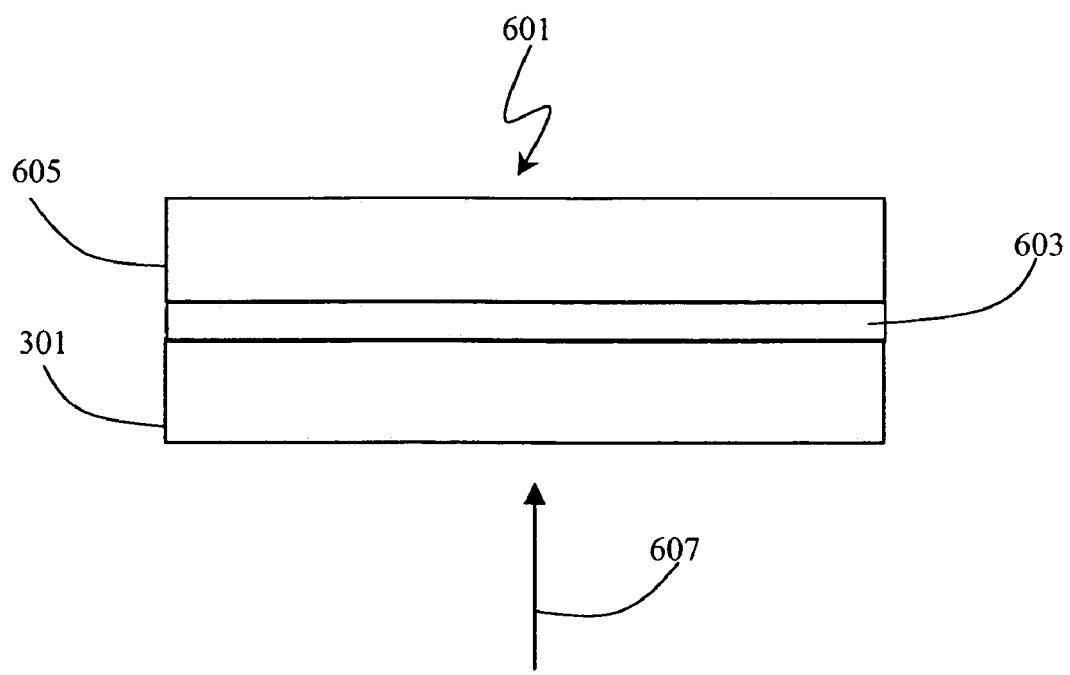
FIG. 6 is an elevation schematic of the optical recording medium.

Elevation schematic of the optical-recoding medium 601 is shown in FIG. 6. 603 is a recording layer. In magneto-optical recording media (MO), 603 is a magneto-optical layer made from, for example, rare-earth-cobalt-iron alloys. Optical multilayer 301 according to the invention is placed on the MO layer 603. The light 607 to read the recorded signal is incident from multilayer 301 side. 605 is a protective layer.

The overlayer can easily be disposed on the polymeric substrate by and suitable method such as, for example, solvent casting.

The present invention is further illustrated by the following non-limiting examples of its practice.

EXAMPLE

Poly (N-vinylcarbazole) (polymer I) was obtained from Acros Organics and found to have a Tg of 161° C. by differential scanning calorimetry (DSC).

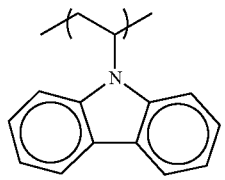

Polymer I (15% solids in toluene) was spun cast onto a TAC substrate. $R_{in}$ and $R_{th}$ of this sample (and the TAC control) were measured with an ellipsometer (model M2000V, J. A. Woollam Co.) at λ=550 nm. Results are shown in TABLE I.

Figure 7:
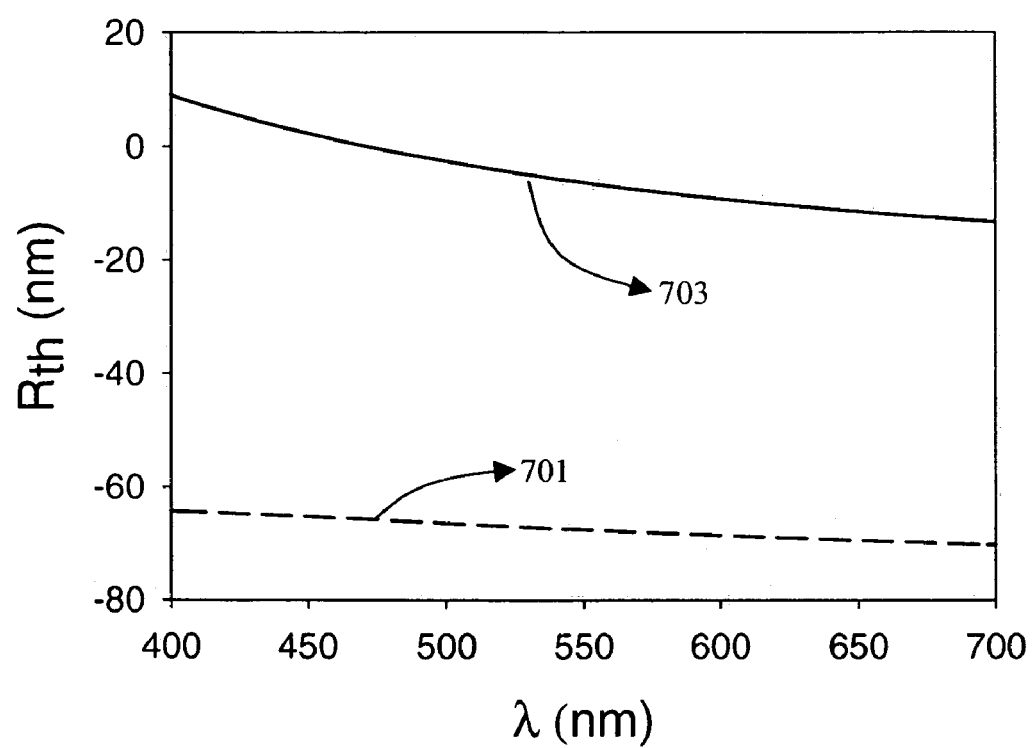
FIG. 7 is a graph showing the wavelength $\lambda$ dependence of the out-of-plane phase retardation $R_{th}$ of the exemplary multilayer according to the invention.

The layer of polymer I did not show any sign of a long-range order. Therefore the layer was determined to be comprised of an amorphous polymer. This optical multilayer has a $R_{th}$ between +30 and −30 nm at a λ between 400 and 700 nm. $R_{th}$ of TAC and multilayer are shown as functions of λ with dash 701 and solid 703 lines, respectively in FIG. 7.

TABLE I

| Polymer I Layer thickness (μm) | $R_{in}$, In-Plane Retardation (nm) | $R_{th}$, Out-of-Plane Retardation (nm) |
|---|---|---|
| 0 (control) | 3 | −63 |
| 3 | 3 | −7 |

The invention has been described in detail with particular reference to certain preferred embodiments thereof, but it will be understood that variations and modifications can be effected within the scope of the invention. The entire contents of the patents and other publications referred to in this specification are incorporated herein by reference.

| PARTS LIST | |
|---|---|
| 101 | film |
| 103 | plane of the film |
| 201 | backlight assembly |
| 203 | backlight |
| 205 | diffusing film |
| 207 | brightness enhancement film |
| 209 | reflective polarizer |
| 211 | substrate |
| 213 | polarizing layer |
| 215 | absorptive polarizer |
| 217 | bottom substrate |
| 219 | absorptive polarizing layer |
| 221 | top substrate |
| 301 | optical multilayer |
| 303 | polymeric substrate |
| 305 | amorphous polymeric overlayer |
| 401 | liquid crystal |
| 403 | randomly oriented polymer chain in x-y plane |
| 501 | absorptive polarizer |
| 503 | substrate |
| 505 | polarizing layer |
| 507 | polarizer |
| 601 | optical recording medium |
| 603 | recording layer |
| 605 | protective layer |
| 607 | incident light for reading signal |
| 701 | dash line showing the wavelength dependence of $R_{th}$ of TAC |
| 703 | solid line showing the wavelength dependence of $R_{th}$ of the optical multilayer |
| S | order parameter |
| θ | an angle between the reference direction and the individual segment of the polymer chain |
| φ | angle of incidence of light |
| nx | index of refraction in x direction |
| ny | index of refraction in y direction |
| nz | index of refraction in z direction |
| no | ordinary index of refraction |
| ne | extraordinary index of refraction |
| $\Delta n_{th}$ | out-of-plane birefringence |
| $\Delta n_{in}$ | in-plane birefringence |
| $\Delta n_{int}$ | intrinsic birefringence of polymer |
| $\Delta n_p$ | birefringence of polymer |
| d | thickness of the film |
| $R_{th}$ | out-of-plane phase retardation |
| $R_{in}$ | in-plane phase retardation |
| λ | wavelength |
| $I_{out}$ | out coming light intensity |
| $I_{in}$ | input light intensity |

What is claimed is:

1. An optical multilayer comprising a polymeric substrate having a non-zero out-of plane birefringence and an amorphous polymeric overlayer that comprises an amorphous polymer having a Tg value above 160° C. and having the sign of its out-of-plane birefringence opposite to that of the polymeric substrate so as to provide a total out-of-plane phase retardation of said optical multilayer of between −30 nm and 30 nm for wavelengths of light between 400 and 700nm, wherein the out-of-plane birefringence of said polymeric substrate is negative and the out-of-plane birefringence of said amorphous polymeric overlayer is positive.

2. An optical multilayer according to claim 1, wherein the out-of-plane birefringence of said amorphous polymeric overlayer is more positive than 0.005 at a wavelength 550 nm.

3. An optical multilayer according to claim 1, wherein the thickness of said amorphous polymeric overlayer is between 1 and 50 μm.

4. An optical multilayer according to claim 3 wherein, the thickness of said amorphous polymeric overlayer is between 5 and 20 μm.

5. An optical multilayer according to claim 1 wherein, the transmission of said optical multilayer is higher than 80%.

6. An optical multilayer according to claim 5 wherein, the transmission of said optical multilayer is higher than 90%.

7. An optical multilayer according to claim 1 wherein, said amorphous polymeric overlayer comprises a polymer with negative intrinsic birefringence.

8. An optical multilayer according to claim 7, wherein said polymer has non-visible chromophores off of the polymer backbone.

9. An optical multilayer according to claim 1 wherein, said amorphous polymeric overlayer comprises at least one polymer containing A) poly (4vinylphenol), B) poly (4vinylbiphenyl), C) poly (N-vinylcarbazole), D) poly(methylcarboxyphenylmethacrylamide), E) poly [(1-acetylindazol-3-ylcarbonyloxy)ethylene], F) poly(phthalimidoethylene), G) poly(4-(1-hydroxy-1-methylpropyl)styrene), H) poly(2-hydroxymethylstyrene), I) poly(2-dimethylaminocarbonylstyrene), J) poly(2-phenylaminocarbonylstyrene), K) poly(3-(4-biphenylyl)styrene), L) poly(4-(4-biphenylyl)styrene), M) poly(4-cyanophenyl methacrylate), N) poly(2,6-dichlorostyrene), O) poly(perfluorostyrene), P) poly(2,4-diisopropylstyrene), Q) poly(2,5-diisopropylstyrene), and R) poly(2,4,6-trimethylstyrene).

10. An optical multilayer according to claim 1 wherein, the thickness of said polymer substrate is between 10 μm and 5 mm.

11. An optical multilayer according to claim 1 wherein, the thickness of said polymer substrate is between 30 μm and 2 mm.

12. An optical recording medium comprising a recording layer and optical multilayer according to claim 1 disposed on at least one side of said recording surface.

13. An optical recording medium according to claim 12 wherein, polymeric substrate of said optical multilayer is polycarbonate.

14. A polarizer comprising a polarizing layer and optical multilayer according to claim 1 disposed on at least one surface of said polarizing layer.

15. A polarizer according to claim 14, wherein the polymeric substrate of said optical multilayer is triacetylcellulose.

16. A polarizer according to claim 14, wherein said polarizer is reflective polarizer.

17. A polarizer according to claim 14, wherein said polarizer is transmissive polarizer.

18. A liquid crystal display comprising a liquid crystal cell and at least one polarizer of claim 14.

19. An optical multilayer according to claim 1 wherein, said amorphous polymeric overlayer comprises at least one copolymer made from the following list of monomers: A) 4 vinylphenol, B) 4 vinylbiphenyl, C) N-vinylcarbazole, D) methylcarboxyphenylmethacrylamide, E) (1-acetylindazol-3-ylcarbonyloxy)ethylene, F) phthalimidoethylene, G) 4-(1-hydroxy-1-methylpropyl)styrene, H) 2-hydroxymethyistyrene, I) 2-dimethylaminocarbonylstyrene, J) 2-phenylaminocarbonyistyrene, K) 3-(4-biphenylyl)styrene, L) 4-(4-biphenylyl)styrene, M) 4-cyanophenyl methacrylate, N) 2,6-dichlorostyrene, O) perfluorostyrene, P) 2,4-diisopropylstyrene, Q) 2,5-diisopropylstyrene, and R) 2,4,6-trimethyistyrene.

* * * * *